(No Model.)
J. C. McMANUS.
PACKER FOR OIL OR GAS WELLS.
No. 423,337. Patented Mar. 11, 1890.
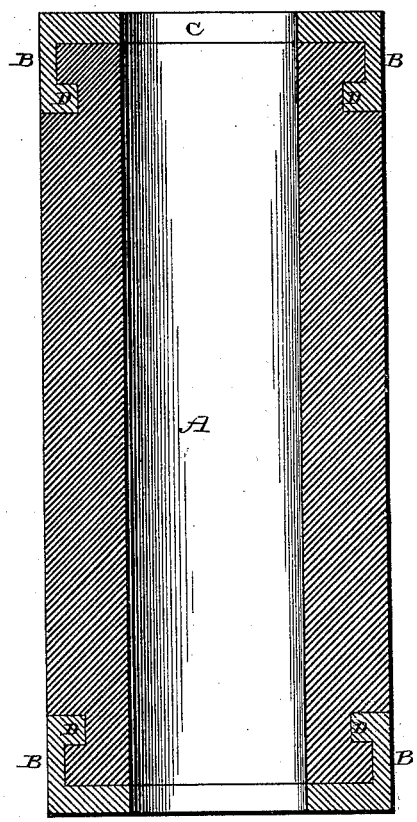

UNITED STATES PATENT OFFICE.

JOHN C. McMANUS, OF KENDALL BOROUGH, PENNSYLVANIA.

PACKER FOR OIL OR GAS WELLS.

SPECIFICATION forming part of Letters Patent No. 423,337, dated March 11, 1890.

Application filed December 23, 1889. Serial No. 334,629. (No model.)

*To all whom it may concern:*

Be it known that I, JOHN C. MCMANUS, a citizen of Pennsylvania, residing at Kendall Borough, in the county of McKean and State of Pennsylvania, have invented certain new and useful Improvements in Packers for Oil or Gas Wells; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in packers for oil or gas wells; and it consists in the particular construction hereinafter described, and particularly pointed out in the claim.

The object of my invention is to produce a metallic protecting-ring for rubber packers for oil or gas wells, which is composed of a single piece and so constructed that it can be molded into the packer, and at the same time provide a protection for the upper and lower peripheries and ends of the rubber, and thus prevent all splitting and tearing of the rubber at either end.

The accompanying drawing represents a vertical section of a packing which embodies my invention.

A represents the tubular portion of the packing, which is made of rubber, and B the protecting-rings which are applied to its opposite ends, as shown. The outer flange C of each of these rings is preferably made thicker than any other portion, and is made just wide enough to extend to the edge of the tubular opening made through the packing A. At the inner end of each ring B is formed a second narrower flange D, and by these two flanges C D is formed a recess, into which the packing is run or molded, and thus practically holds the rings and packing inseparably together. These rings B are placed in opposite ends of the mold, and then the ends of the packing A are cast or molded inside of the rings B, so as to form by said molding process the three parts securely together, and thus prevent any possibility of their becoming separated. These rings serve to protect the rubber and prevent all splitting and tearing of the rubber at either end from the pressure or weight upon the packing, or by withdrawing the packing from the well, or from any other cause.

Having thus described my invention, I claim—

A protecting-ring for rubber packers to be molded therein, consisting of an annular vertical portion of the same diameter as the rubber, whereby it can be placed in the mold, a wide horizontal inwardly-extending flange at its outer end, which extends over the rubber, and a narrower inwardly-extending horizontal flange at its inner end of less diameter than the rubber, the whole composed of one piece of metal, and thereby securely connected to the ends of the packer, substantially as shown and described.

In testimony whereof I affix my signature in presence of two witnesses.

JOHN C. McMANUS.

Witnesses:
   A. R. STEWART,
   J. W. MILLER.